(No Model.)

C. M. CONRADSON.
AUTOMATIC CHUCK.

No. 497,632. Patented May 16, 1893.

Witnesses,
Sidney P. Hollingsworth
James F. Duhamel

C. M. Conradson,
Inventor,
by his attorneys,
Dodge & Sons

THE NORRIS PETERS CO., PHOTO-LITHO., WASHINGTON, D. C.

UNITED-STATES PATENT OFFICE.

CONRAD M. CONRADSON, OF MADISON, WISCONSIN.

AUTOMATIC CHUCK.

SPECIFICATION forming part of Letters Patent No. 497,632, dated May 16, 1893.

Application filed November 28, 1892. Serial No. 453,422. (No model.)

*To all whom it may concern:*

Be it known that I, CONRAD M. CONRADSON, a citizen of the United States, residing at Madison, in the county of Dane and State of Wisconsin, have invented certain new and useful Improvements in Automatic Chucks, of which the following is a specification.

My invention relates to automatic chucks, designed more particularly for use in screw machines, but obviously applicable to all classes and styles of machines in which it is desired to clamp or to release the stock while the machine is running.

Figure 1:
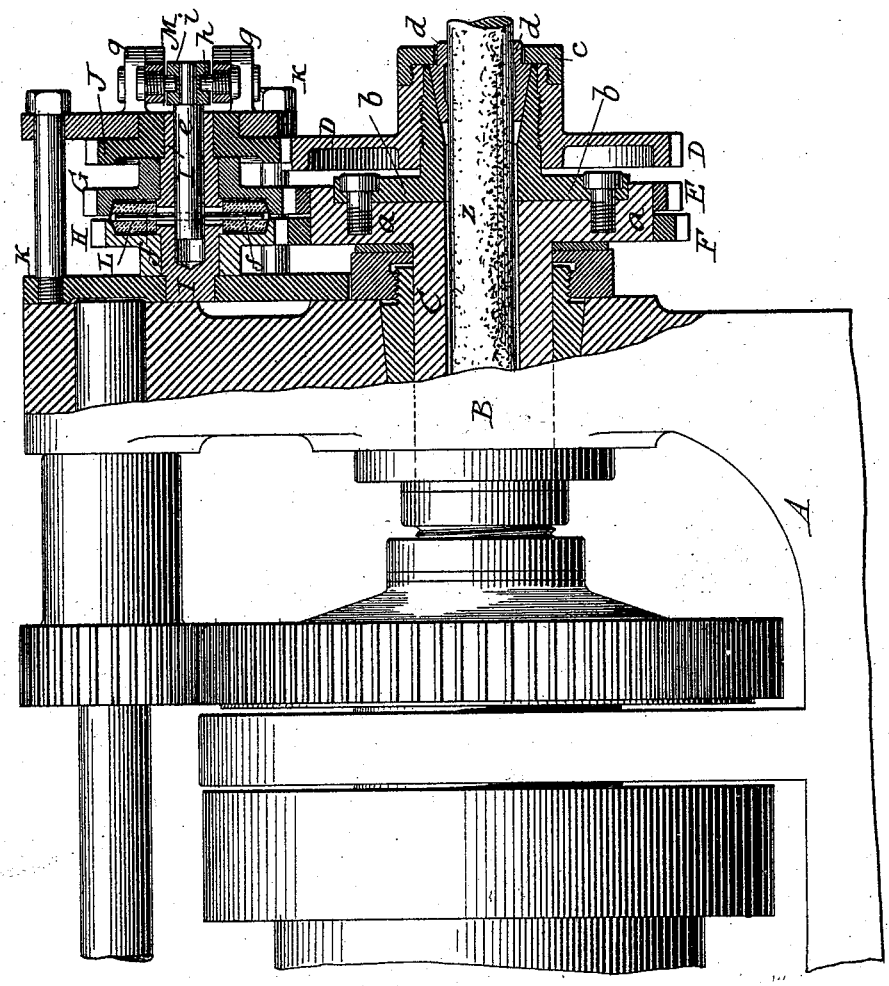
Figure 2:
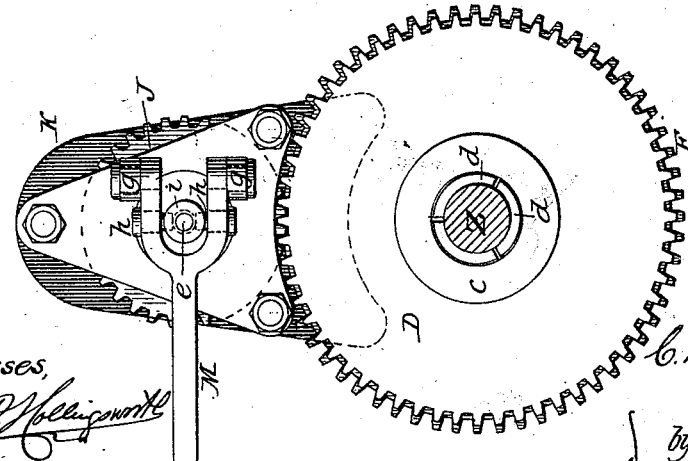

In the drawings,—Figure 1 is a face view of a portion of a turret lathe, showing the chuck in vertical section; and Fig. 2, a front face view of the chuck.

A indicates a portion of the main frame of the machine; B the uprights or standards thereof; and C the hollow arbor journaled in the standards. The arbor is provided at its inner end with a plate or disk $a$ to which is secured a flanged bushing or disk $b$; these parts forming in effect a part or continuation of the arbor or spindle. The arbor or spindle (treating these parts as a part of the arbor) is threaded externally at its outer end, and mounted upon the threaded portion is a combined gear wheel and nut D. This nut has a collar $c$ which bears against the outer faces of the collets $d$; so that when the nut moves toward the headstock, the collar will carry the collets into the conical seat or socket in the end of the spindle, and, by reason of the form of the socket, cause the collets to bear upon and firmly grasp the rod or stock.

In order to turn the nut D first in one direction and then in the other, I provide the arbor, or its disk $a$, with gear bands E and F, (the former having fifty-nine teeth and the latter sixty-one teeth) which mesh with the gears G H (having respectively thirty-one and twenty-nine teeth) mounted loosely upon a hollow shaft I, as shown in Fig. 1. Secured upon shaft I, there is a pinion J (which has thirty teeth) to engage the pinion-nut D having sixty teeth,—the said shaft being supported in a suitable framework or support K secured to the standards of the main frame.

The opposing faces of the gears G H are recessed to receive a clutch, which, in the present instance, is made in the form of a beveled disk L of rawhide, leather, or any other suitable material. This disk or clutch is prevented from rotating independently of the hollow shaft I, by means of a rod or stem $e$ which has near its inner end a pin $f$ which works through a slot in the hollow shaft and engages the disk. In order to move the rod lengthwise, I employ a lever M which is hinged or pivoted in lugs $g$ on the front face of the frame, and provided with studs $h$ to engage a collar $i$ on the rod.

Before proceeding to describe the operation of the device, I desire to state that the proportions of the gears here given, are not such as are now used in practice, but will serve to illustrate the principle involved.

Supposing the collets to be closed upon the stock or body Z, and it is desired to release the stock, the lever M is pressed backward toward the headstock and carries the rod or stem $e$ inward within the hollow shaft sufficiently far to throw the friction disk L into engagement with the loose gear H. Motion imparted to the arbor (which is assumed to rotate continuously) is transmitted through the gears F and H and disk L, to the shaft I, and from the latter, to the gear nut D through the gear J. Owing to the difference in the sizes of the gears thus brought into action, the gear-nut will be turned or rotated faster than its spindle or arbor and will consequently be unscrewed from the latter. As soon as the collar $c$ has been moved far enough to release the collets $d$, the lever M will be brought back to an intermediate position where the disk L will not engage either of the gears G H, or the lever may be left alone, for when the gear-nut screws off far enough to strike the frame or casing K, the resistance offered to the rotation of the nut by the latter will overcome the friction of the disk L and cause the latter to slip. It is better, however, to bring the lever back to the medial position. If now the stock be fed forward in any suitable manner, the chuck may be closed upon it by throwing the lever M forward away from the headstock, thus bringing the friction disk or clutch L into engagement with the gear wheel G and thereby locking said wheel to the shaft I. Motion is now transmitted from the arbor or spindle through gears E, G, and disk L, to the shaft I, and from the latter to gear J and gear-nut D. Owing to the difference in the sizes of the gears thus brought into action, the gear nut D will be retarded in its rotation and consequently screwed back upon the arbor. This action is continued until the chuck jaws or collets close down upon the stock with sufficient firmness to cause the disk or clutch L to slip in the gear G,—the adjustment and arrangement of this disk being such as to cause the collets to give any desired grip to the stock before it (the clutch) slips. By this means the stock is gripped with uniform pressure even of varying size. For holding stock of different cross-section and of greatly different size, suitable collets will be employed.

Having thus described my invention, what I claim is—

1. In combination with a rotating arbor, a chuck carried thereby, and differential gearing between the arbor and the jaw-actuating member of the chuck.

2. In combination with a rotating arbor, a chuck carried thereby, and differential gearing actuated by the arbor for imparting motion to the jaw-actuating member of the chuck.

3. In combination with the hollow arbor, threaded externally, and having a conical seat to receive the jaws; the single gear nut D to act upon the jaws; and gearing for actuating the gear nut in both directions from the rotating arbor.

4. In combination with the hollow arbor, threaded externally, and having a conical seat to receive the jaws; a gear-nut D to act upon the jaws; and differential gearing between the arbor and the gear-nut.

5. In combination with the hollow arbor, threaded externally, and having a conical seat to receive the jaws; a gear nut D to act upon the jaw; differential gearing between the arbor and the gear-nut; and a friction clutch forming a part of such gearing.

6. In combination with the hollow arbor C, threaded externally, and provided with a socket to receive the jaws $c$; a gear-nut D to act upon the jaws; gears E and F carried by the arbor; a shaft I provided with fast gear J, and loose gears G and H; a friction clutch for connecting either of the loose gears to the shaft; and means for actuating the clutch.

7. In combination with the hollow arbor and the chuck carried thereby; gearing actuated by the arbor for moving the jaw-actuating member of the chuck; and a yielding device interposed between the said member and the arbor.

8. In combination with the hollow arbor provided with the gears E F, and the jaws $d$; the gear-nut D provided with collar $c$; hollow shaft I provided with fast gear J, loose gears G H, and friction disk L; rod $e$ connected with the disk; and a lever M connected with the rod.

In witness whereof I hereunto set my hand in the presence of two witnesses.

CONRAD M. CONRADSON.

Witnesses:
W. R. BAGLEY,
C. H. ALLYN.